United States Patent [19]  [11] 4,125,318
Scibor-Rylski  [45] Nov. 14, 1978

[54] TIR MODULATOR
[75] Inventor: Marek T. Scibor-Rylski, Hartley Wintney, England
[73] Assignee: Xerox Corporation, Stamford, Conn.
[21] Appl. No.: 783,877
[22] Filed: Apr. 1, 1977
[30] Foreign Application Priority Data
Jul. 30, 1976 [GB] United Kingdom ............... 31918/76
[51] Int. Cl.² .............................................. G02F 1/32
[52] U.S. Cl. .................................................. 350/356
[58] Field of Search ............. 350/160 R, 161 W, 356; 331/94.5 M

[56] References Cited
U.S. PATENT DOCUMENTS
3,958,862  5/1976  Scibor-Rylski ................. 350/160 R Primary Examiner—William L. Sikes
Attorney, Agent, or Firm—James J. Ralabate; Sheldon F. Raizes; Irving Keschner

[57] ABSTRACT

An electro-optic modulator/deflector for use with a light beam comprising at least two wavelengths of light including an electro-optical material and an electrode pattern adjacent a first surface of said material arranged in response to a voltage supply to provide an electric field in the material to influence the deflection of the light beam at the moment of total internal reflection at the first surface. The light beam is divided into its constituent wavelengths which are directed to different parts of the first surface, the electrode pattern comprising interdigitated electrodes arranged so as to modulate separately the different wavelengths by predetermined respective amounts.

7 Claims, 6 Drawing Figures

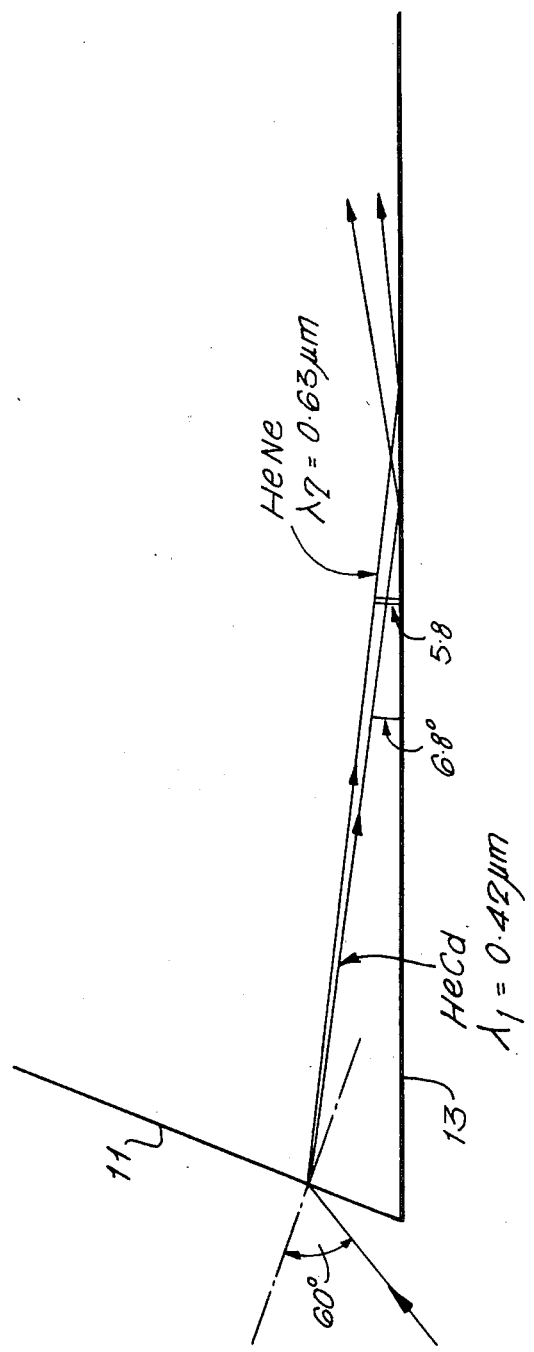

TIR MODULATOR

FIELD OF THE INVENTION

This invention relates to electro-optical modulator/deflectors.

BACKGROUND OF THE INVENTION

Particular types of electro-optical modulators have been recently developed, such as, for example, described in Electronic Letters 9, 1973 pages 309 and 310 and in Proceedings of IEE Vol 19 + No. 7, 1972 pages 807 to 814. The operation of these modulators depends on the effect of applying a voltage to a symmetrical electrode pattern to induce periodic change of the refractive index in an electro-optical element in the region of the surface of the element at the moment of total internal reflection. The resulting symmetrical periodic phase change induced in the wave-front of a light beam directed through or at the electro-optical element produces a far field pattern of the Raman-Nath form exhibiting symmetry about the zero energy order. The zero order of the output beam can then be modulated by adjusting the applied voltage to the electrode pattern to alter the distribution of the light from the zero order into higher orders, and as often desired, to eliminate the zero order.

The electro-optical modulators so far described have operated on light beams of single wavelengths. It would be desirable if such a modulator can be provided which operate on light beams of more than wavelength.

SUMMARY OF THE PRESENT INVENTION

It is an object of the present invention to provide an improved electro-optical modulator.

According to the present invention there is provided an electro-optic modulator/deflector for use with a light beam formed of at least two wavelengths of light including an electro-optical material and an electrode pattern adjacent a first surface of said material arranged in response to a voltage supply to provide an electric field in the material to influence the deflection of the light beam at the moment of total internal reflection at the first surface. The light beam is divided into its constituent wavelengths and directed at different parts of the first surface, the electrode pattern comprising interdigitated electrodes arranged so as to modulate separately the different wavelengths by predetermined respective amounts.

DESCRIPTION OF THE DRAWINGS

For a better understanding of the invention as well as other objects and further features thereof, reference is made to the following description which is to be read in conjunction with the following drawings wherein:

FIG. 6 shows illustratively a crystal configuration to facilitate the description of specific examples.

DESCRIPTION OF THE PREFERRED EMBODIMENT

Figure 1:
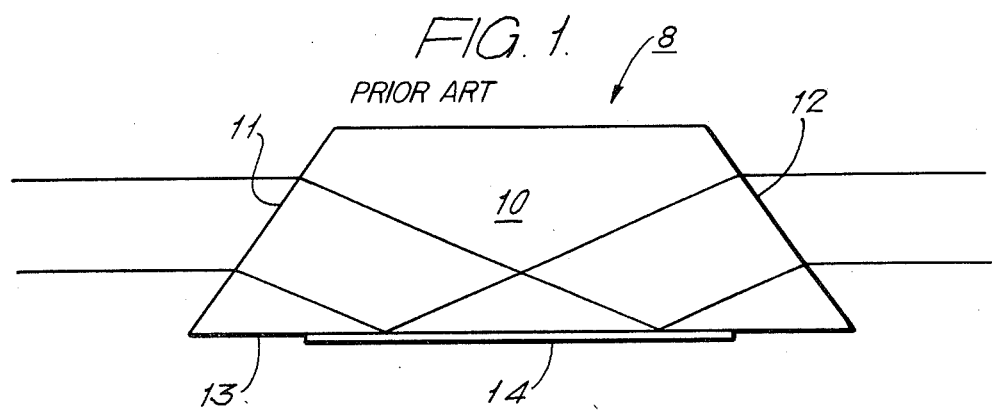
FIG. 1 shows schematically and illustratively a prior art type of modulator/deflector configuration.

Referring to FIG. 1, a prior art modulator 8 consists of electro-optic material formed of a $LiNbO_3$ xy cut crystal 10. The crystal 10 has three polished surfaces 11, 12 and 13. The angles of surfaces 11 and 12 are arranged such that a collimated beam of light of single wavelength parallel to the plane of the surface 13 is deflected at the surfaces 11 and 12 to incur total internal reflection at the surface 13. It will be appreciated that other than the shown crystal shapes are possible to achieve the total internal reflection. However, in the form shown a crystal with overall dimensions of about 4 × 4 × 15 mm provides satisfactory operation.

Figure 2:
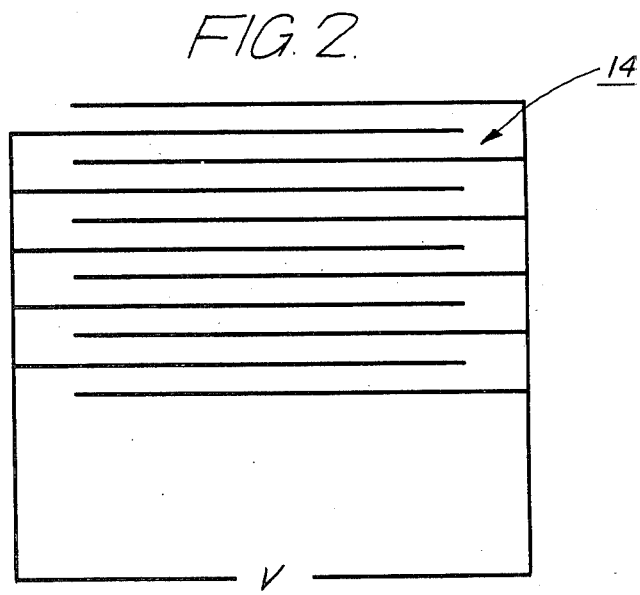
FIG. 2 shows a conventional electrode pattern for use with such modulators.

An electrode pattern 14 is deposited on the surface 13 in an array as shown in FIG. 2 with the operative electrodes parallel to the incident light beam. A voltage V (FIG. 2) is applied in use to the electrode pattern and induces an electric field adjacent the surface 13 which alters the refractive index of the crystal. With the pattern shown, the modulator 8 behaves in a similar manner to a phase diffraction grating to alter the light output beam.

The output beam is diffracted into a series of orders whose intensities vary with electrode voltage. For example, if a typical full modulation voltage V of 70 volts is applied to the electrodes, the output light beam contains no zero order energy, the energy being transferred to other orders of energy. Thus, if these orders are stopped by suitable obstacles, the incident or original beam direction can be seen to be modulated by the application of the voltage.

As a typical example, the electrodes are 12 $\mu$m wide and 3.5 mm long, and the pitch between individual electrodes is 50 $\mu$m. The modulator/deflectors of this kind are at least substantially insensitive to temperature variation because a phase-modulated technique is used which is virtually independent of temperature if temperature-independent electro-optic coefficients are used, for example $r_{22}$ in $LiNbO_3$. Suitable electro-optic materials besides $LiNbO_3$ include $LiTaO_3$, BSN, ADP, KDP, $KD^xP$, KDA and $Ba_2NaNb_5O_{15}$.

Figure 3:
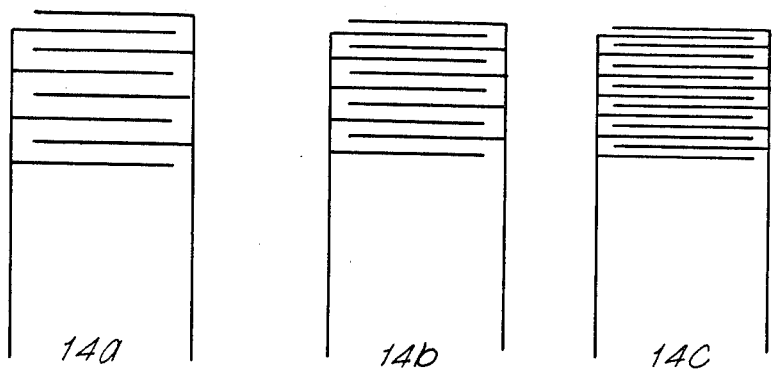
FIG. 3 shows schematically and illustratively an electrode pattern for one novel modulator/deflector configuration.
Figure 4:
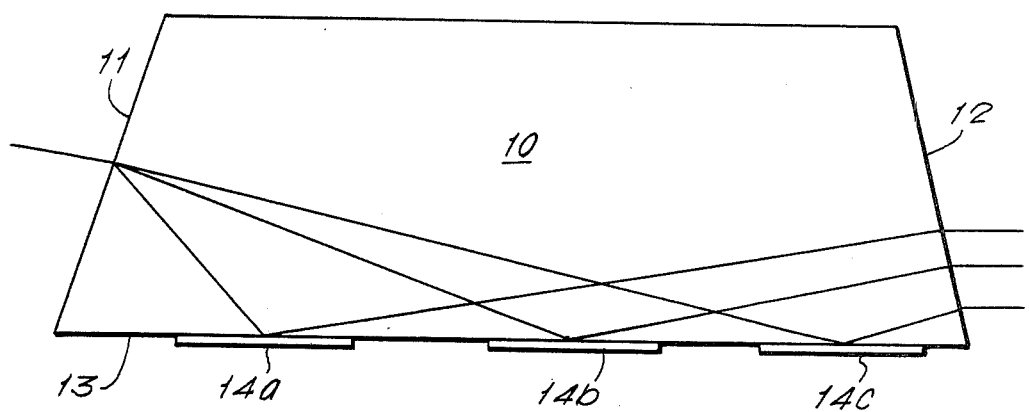
FIG. 4 shows illustratively the light path of a light beam of three discrete wavelengths in the novel modulator/deflector configuration of FIG. 3.

In FIG. 3, the electrode pattern 14 comprises three separate sets of interdigitated electrodes 14a, 14b and 14c and, as seen in FIG. 4, these sets are positioned at different parts of the surface 13. The pitches between the three sets of electrodes are different and the sets are connected in parallel to a low d.c. voltage supply. Each set influences discrete and different wavelengths of light respectively at the moment of reflection at the surface 13. The influence is arranged such that the reflected light of each wavelength is modulated by the same amount at the surface 12. This enables the different wavelengths of light to be reconstituted into a single light beam by a lens, for example, positioned in the light path beyond the crystal 10.

Figure 5:
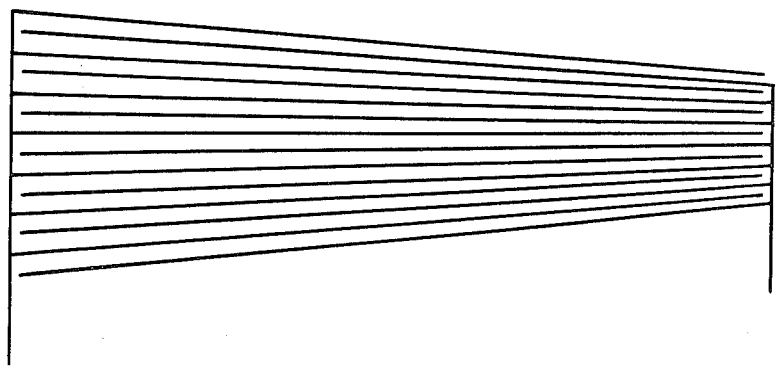
FIG. 5 shows an electrode pattern for another novel modulator/deflector configuration.

In another embodiment instead of providing discrete or distinct sets of electrodes as in FIG. 4, the pitch of the electrodes is varied by a single tapered electrode pattern as shown in FIG. 5. The pitch of the electrodes decreases in the direction of travel of the light beam. Thus the shortest wavelength of, say, a three wavelength light beam is reflected adjacent electrodes of the coarsest pitch and the longest wavelength is reflected adjacent electrodes of the finest pitch. The degree of taper is arranged such that the different wavelengths are modulated by the same amount so that the different wavelengths can be combined to form a single light beam after reflection.

In a further arrangement (not shown), sets of electrodes generally as shown in FIG. 3 are provided but each of the sets have the same pitch. In the further arrangement, the voltage supply to each set is different and adjusted to provide the same amount of modulation in each of the wavelengths so that reconstitution of the different wavelengths of light into the single beam is again possible.

It will be appreciated that whereas three wavelength beams of light have been discussed, a multiple wavelength beam can be modulated using multiple sets of electrodes or the varying pitch electrode pattern of FIG. 5. In this way, for example, a white light beam can be modulated satisfactorily by single devices of the present invention.

The invention is made possible because of the interrelationships between the applied voltage and the wavelength and the applied voltage and incident angle at the moment of total internal reflection. The modulation of the reflected light is also dependent on the pitch of the electrodes. It will therefore be appreciated that very many forms of the device are possible. Basically, it is necessary in carrying out the invention to separate the constituent parts of the incident light beam into discrete wavelengths so as to be able to influence separately and respectively each wavelength at the moment of internal reflection by applying a predetermined voltage to electrodes having selected pitches. Thereafter in most applications of the invention, the different reflected wavelengths can be combined because the different reflected wavelengths can be modulated by the same amount. It will be appreciated that if a different electro-optical material is used the selected conditions will be different. Sometimes physical conditions such as temperature can also influence modulation and if this is the case specific environmental conditions are required for the crystal to carry out the invention.

It will be noted in the embodiments described that the incident beam is parallel to the surface 13. Such arrangements are convenient in providing an input and output beams which are parallel. In practice however, this is often difficult to achieve when relying on a single refraction to separate the wavelengths of the incident beam and other incident angles for the input beam are required to increase separation.

It will be understood in this respect that if the incident light beam is near normal or normal to the surface 11 little or no separation of the wavelengths of the light beam takes place. This is normally an unsatisfactory situation because the influence of the electrode pattern at the moment of internal reflection cannot then be arranged to selectively influence the different wavelengths respectively to achieve satisfactory modulation. In such a situation each wavelength is influenced by a different amount in dependence upon its wavelength and it is not possible to provide the same modulation of all wavelengths.

It will be appreciated however that if the angle of the refracting surface, that is the surface 11 in the described embodiments, and angle of the incident beam are suitably selected like modulation of all wavelengths can be achieved with some light beams with an electrode pattern as shown in FIG. 2. This is because the amount of modulation is then dependent only on the incident angle onto the surface 13, if the applied voltage and electrode pitch is fixed. Thus, if the constituent wavelengths are arranged to strike the surface at appropriate and different angles each wavelength experiences the same modulation.

In many instances the separation of the light beam into its constituent wavelengths by a single refraction does not provide a sufficient difference in incident angle at the reflecting surface. To achieve a desirable and workable difference the light beam is therefore separated into its constituent parts at least to some extent before the light beam arrives at the surface 11. Thus, an initial separation of the light beam is arranged prior to the surface 11 and refraction at the surface 11 further separates the different wavelengths.

Likewise, the re-combination of the constituent wavelengths of the light beam after reflection at the surface 13 into a parallel beam may require refraction at the surface 12 combined with refraction at further interfaces (not shown) in the light path beyond the surface 12.

So far the invention has been described in relation to the overall modulation of a light beam constituted by more than one wavelength for use after modulation as a light beam having the same constituent parts. In this way the extinction of the zero order of all wavelengths can be achieved at the same time by the application of one or more low voltages, as appropriate. It is usually important in practice for modulators generally to be able to achieve simultaneous modulation of all wavelengths where beam energy must be conserved. If simultaneous modulation is not achieved substantial reduction in beam energy is experienced as one or more wavelengths of the incident beam cannot be made use of after passing through the crystal.

By contrast, it is sometimes the case that constituent wavelengths of a light beam might be used separately, in analysis for example. With the present invention, as the wavelengths are individually modulated each wavelength can be at least somewhat separated into its higher orders. In this respect, different zero order extinction voltages are applied one at a time to the modulator and the output of the modulator measured at each voltage to determine, for example, the relative energy of the constituent wavelengths of an incident light beam.

Likewise, using the same principle, selective individual modulation enables an output beam to be provided by the modulator having selected energy distribution levels for each constituent color at a single predetermined applied voltage, or two or more voltages if more than one set of electrodes is used. Thus, whereas most presently foreseen practical applications of the invention tend to be for maximizing the cut-off efficiency or transmission ratios of the modulator where light beams of two or more wavelengths are required to be modulated, other applications are possible with the present invention where deliberate individual variation of modulation by different wavelengths is required.

Various embodiments of the invention are now described with reference to FIG. 6 for modulating light generated in combination by helium-cadmium and helium-neon lasers to provide a light beam having two wavelengths respectively $\lambda_1 = 0.42$ $\mu$m and $\lambda_2 = 0.63$ $\mu$m. An $x$-$y$ cut lithium niobate electro-optical crystal is provided such that the two wavelengths reach the total internal reflecting surface at respective incidence angles at 5.8° and 6.8°. This is achieved by directing the combined laser beam at 60° to the normal and so provide a 1° dispersion at the surface 13.

In the first embodiment, a continuous diverging electrode pattern, as shown in FIG. 5, is provided which extends along the surface 13. The pitch of the electrode is arranged to be 0.10 mm for $\lambda_1$, and 0.115 mm for $\lambda_2$ at the respective points of incidence. This provides substantially equal modulation of the total light beam of the lasers. When 75 volts is applied to the electrode pattern the zero orders of the diffraction patterns of the $\lambda_1$ and $\lambda_2$ light are extinguished simultaneously.

In a second embodiment, two of the separate sets of electrodes, shown in FIG. 3, are provided having pitches of 0.100 mm for $\lambda_1$, and 0.115 mm for $\lambda_2$ respectively. When 75 volts is applied to both sets of electrodes the $\lambda_1$ and $\lambda_2$ zero orders are modulated such that the diffraction pattern are extinquished simultaneously.

In a third embodiment two sets of electrodes, as in the second embodiment, are provided. In the third embodiment the pitches of both sets is 0.100 mm. To achieve simultaneous zero order extinction, voltages of 75 and 65 volts are applied respectively to the $\lambda_1$ and $\lambda_2$ electrodes.

It will be appreciated that due to the slow rise of energy in the zero order at voltages beyond extinction, very little light will appear from $\lambda_2$ wavelengths when 75 volts are applied. It is therefore realized that in some practical embodiments very nearly simultaneous extinction occurs at 75 volts in this third embodiment. Thus the application of 75 volts may well achieve sufficient extinction for many practical purposes.

It will be appreciated that for modulating a beam of light as a light source, that is opposed to modulating for analysis for example, the first embodiment is preferred in principle because all wavelengths between $\lambda_1$ and $\lambda_2$ in the example are correctly modulated to achieve simultaneous extinction of the zero order patterns at a single applied voltage. This is because intermediate wavelengths strike the surface 13 at intermediate incident angles and are influenced by electrodes of intermediate pitches. Further, with a converging electrode pattern in a relatively broad light beam application, broad constituent wavelength beams are reflected at or very nearly the correct modulation across the width of the beams. In such situations the so-called different parts of the surface 13 having electrode pitches to influence constituent wavelength of the light beam may be parts which overlap in a practical embodiment.

It has been explained earlier that in some embodiments of the invention a light beam may be uniformly modulated simply due to the constituent parts having separate and distinct incident angles at the moment of total internal reflection, the pitch of the electrodes being uniform. In the embodiments described, the $\lambda_1$ and $\lambda_2$ wavelengths would have to reach the surface at incident angles separated by approximately 1.6°. This separation cannot be achieved in a single refraction using lithium niobate. However, the separation can be provided by adding an extra component, a prism for example, to separate the $\lambda_1$ and $\lambda_2$ light before light beam reaches the surface 11 by about $\frac{1}{2}°$.

A specific embodiment of the invention thus includes a prism or other constituent wavelength separating device arranged to separate the $\lambda_1$ and $\lambda_2$ light by approximately $\frac{1}{2}°$ before the combined laser beam strikes the surface 11. In such an embodiment an electrode pattern having parallel interdigitated electrodes is provided of 0.100 mm pitch. At 75 volts extinction of the zero order diffraction pattern is achieved.

The specific embodiment of the invention could be provided, not including the prism, if a crystal is used having a refractive index greater than the refractive index of lithium niobate. If a crystal of, say, barium lithium niobate were made, sufficient separation of the constituent parts could be anticipated without the aid of a prism or similar device.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An electro-optic modulator/deflector for use with a light beam formed of at least two wavelengths of light including an electro-optical material and an electrode pattern adjacent a first surface of said material arranged in response to a voltage supply to provide an electric field in the material to influence the deflection of the light beam at the moment of total internal reflection at the first surface, means for dividing the light beam into its constituent wavelengths and for directing said constituent wavelengths at different parts of said first surface, and electrode pattern comprising interdigitated electrodes arranged so as to modulate separately the different wavelengths by predetermined respective amounts in a manner whereby one of the orders of the diffraction pattern for each wavelength is extinguished substantially simultaneously.

2. An electro-optical modulator accroding to claim 1, in which the pitch of the interdigitated electrodes decreases along the length of the electrode pattern, a voltage of a first value being applied across said interdigitated electrodes.

3. An electro-optical modulator according to claim 1 in which said interdigitated electrodes are arranged in at least two sets for modulating respectively the at least two wavelengths.

4. An electro-optical modulator according to claim 3 in which the sets have different pitches.

5. An electro-optical modulator as defined in claim 3 in which the sets have the same pitches.

6. An electro-optical modulator according to claim 5 wherein a voltage of a first value is applied to one set of said interdigitated electrodes and a voltage of a second value is applied to the other set of interdigitated electrodes, said first voltage value being different than said second value.

7. An electro-optical modulator as defined in claim 4 wherein a voltage of a first value is applied to one set of said interdigitated electrodes and a voltage of a second value is applied to the other set of interdigitated electrodes, said first and second voltage values being equal.

* * * * *